(12) United States Patent
Schlegelmilch et al.

(10) Patent No.: US 12,412,161 B2
(45) Date of Patent: Sep. 9, 2025

(54) CENTRALIZED LEDGER FOR AIRLINE MAINTENANCE CONTROL

(71) Applicant: The Boeing Company, Arlington, VA (US)

(72) Inventors: Richard F. Schlegelmilch, North Bend, WA (US); Gaston Grenier, Surrey (CA); Sanjay Sarup Bhatia, Langley (CA); Satish Shivanand Madiwal, Richmond (CA); Yew Woo, Burnaby (CA); Wendy Co, Vancouver (CA); Kristina A. Denisova, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 130 days.

(21) Appl. No.: 18/491,129

(22) Filed: Oct. 20, 2023

(65) Prior Publication Data

US 2025/0131390 A1    Apr. 24, 2025

(51) Int. Cl.
*G06Q 10/20*        (2023.01)
(52) U.S. Cl.
CPC ......... *G06Q 10/20* (2013.01); *G06Q 2220/00* (2013.01)

(58) Field of Classification Search
CPC ...................................................... G06Q 10/20
USPC ............................................................ 705/305
See application file for complete search history.

(56) References Cited

U.S. PATENT DOCUMENTS

| | | | |
|---|---|---|---|
| 2020/0028691 A1* | 1/2020 | Rao | G06F 8/658 |
| 2020/0382503 A1* | 12/2020 | Sabnis | G06F 16/901 |
| 2021/0359837 A1* | 11/2021 | Guo | H04L 9/0618 |

* cited by examiner

*Primary Examiner* — Lindsay M Maguire
(74) *Attorney, Agent, or Firm* — Yee & Associates, P.C.

(57) ABSTRACT

Processing a vehicle maintenance transaction is provided. The method comprises receiving the transaction and entering the transaction into a blockchain ledger. In response to the transaction, an enhanced smart contract in the blockchain ledger executes. The enhanced smart contract specifies a number of compliance requirements to complete the transaction and automates a workflow for the transaction according to the compliance requirements. A number of notifications regarding the transaction are generated to a number of subscribers to the blockchain ledger. Confirmation of fulfillment of the compliance requirements is received from the subscribers to complete the transaction. The enhanced smart contract, verifies fulfillment of the compliance requirements, and completion of the transaction is recorded in the blockchain ledger.

20 Claims, 11 Drawing Sheets

CENTRALIZED LEDGER FOR AIRLINE MAINTENANCE CONTROL

BACKGROUND INFORMATION

Technical Field

The present disclosure relates generally to vehicle maintenance, and more specifically to maintaining control over changes to maintenance records.

Background

The maintenance activities associated with aircraft maintenance are highly regulated. There are multiple touch points, or sources of record, for recording the maintenance activities, but no single point of truth, which complicates the ability to keep maintenance records consistent. Without a single source of truth, obtaining the complete maintenance historical record is demanding.

SUMMARY

An illustrative embodiment provides a computer-implemented method of processing a vehicle maintenance transaction. The method comprises receiving the transaction and entering the transaction into a blockchain ledger. In response to the transaction, an enhanced smart contract in the blockchain ledger executes. The enhanced smart contract specifies a number of compliance requirements to complete the transaction and automates a workflow for the transaction according to the compliance requirements. A number of notifications regarding the transaction are generated to a number of subscribers to the blockchain ledger. Confirmation of fulfillment of the compliance requirements is received from the subscribers to complete the transaction. The enhanced smart contract, verifies fulfillment of the compliance requirements, and completion of the transaction is recorded in the blockchain ledger.

Another illustrative embodiment provides a system for processing a vehicle maintenance transaction. The system comprises a storage device that stores program instructions and one or more processors operably connected to the storage device and configured to execute the program instructions to cause the system to: receive the transaction; enter the transaction into a blockchain ledger; in response to the transaction, execute an enhanced smart contract in the blockchain ledger, wherein the enhanced smart contract specifies a number of compliance requirements to complete the transaction and automates a workflow for the transaction according to the compliance requirements; generate a number of notifications regarding the transaction to a number of subscribers to the blockchain ledger; receive, from the subscribers, confirmation of fulfillment of the compliance requirements to complete the transaction; verify, by the enhanced smart contract, fulfillment of the compliance requirements; and upon completion of the transaction, record the completion in the blockchain ledger.

Another illustrative embodiment provides a computer program product for processing a vehicle maintenance transaction. The computer program product comprises a computer-readable storage medium having program instructions embodied thereon to perform the steps of: receiving the transaction; entering the transaction into a blockchain ledger; in response to the transaction, executing an enhanced smart contract in the blockchain ledger, wherein the enhanced smart contract specifies a number of compliance requirements to complete the transaction and automates a workflow for the transaction according to the compliance requirements; generating a number of notifications regarding the transaction to a number of subscribers to the blockchain ledger; receiving, from the subscribers, confirmation of fulfillment of the compliance requirements to complete the transaction; verifying, by the enhanced smart contract, fulfillment of the compliance requirements; and upon completion of the transaction, recording the completion in the blockchain ledger.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that there are multiple touch points, or sources of record, for recording the maintenance activities for vehicles such as aircraft. No single point of truth exists for keeping maintenance records consistent.

The illustrative embodiments also recognize and take into account that multi-partner integrations are expensive to develop and maintain and are error prone. Different integration patterns with distinct data models and business processes prohibit share compliance.

The illustrative embodiments provides a centralized ledger based on distributed ledger technology. The centralized ledger provides all participants access to an immutable record of maintenance actions. The central ledger becomes the single point of truth for all maintenance activity. The central ledger ensures no participant can alter a single transaction after it has been recorded. A new transaction is required to "reverse" or correct an error. A ledger policy defines the authority of entities to record specified transaction entries. These central ledger characteristics ensure that regulatory requirements are followed.

Adding a smart contract to the ledger chain allows automatic trigger of pre-defined business actions. For example, a work order transaction is entered to initiate aircraft maintenance service. The smart contract then triggers a request to have supplemental task cards attached to the work order chain. Another smart contract may simply notify registered subscribers based on additions to the transaction chain.

The illustrative embodiments provide a single view of truth with transparency among business partners. The immutable centralized ledger captures partner compliance actions and allows automated compliance validation and execution processes. The centralized ledger becomes the single point of integration among business partners and eliminates the need to maintain point-to-point partner integrations. New business partners can be added to the centralized ledger at any time. Compliance contracts can be supported as enhanced smart contracts used as ledger entries. Enhanced smart contracts meld typical smart contracts with standardized business process models such as BPMN (Business Process Modeling Notation).

Figure 1:
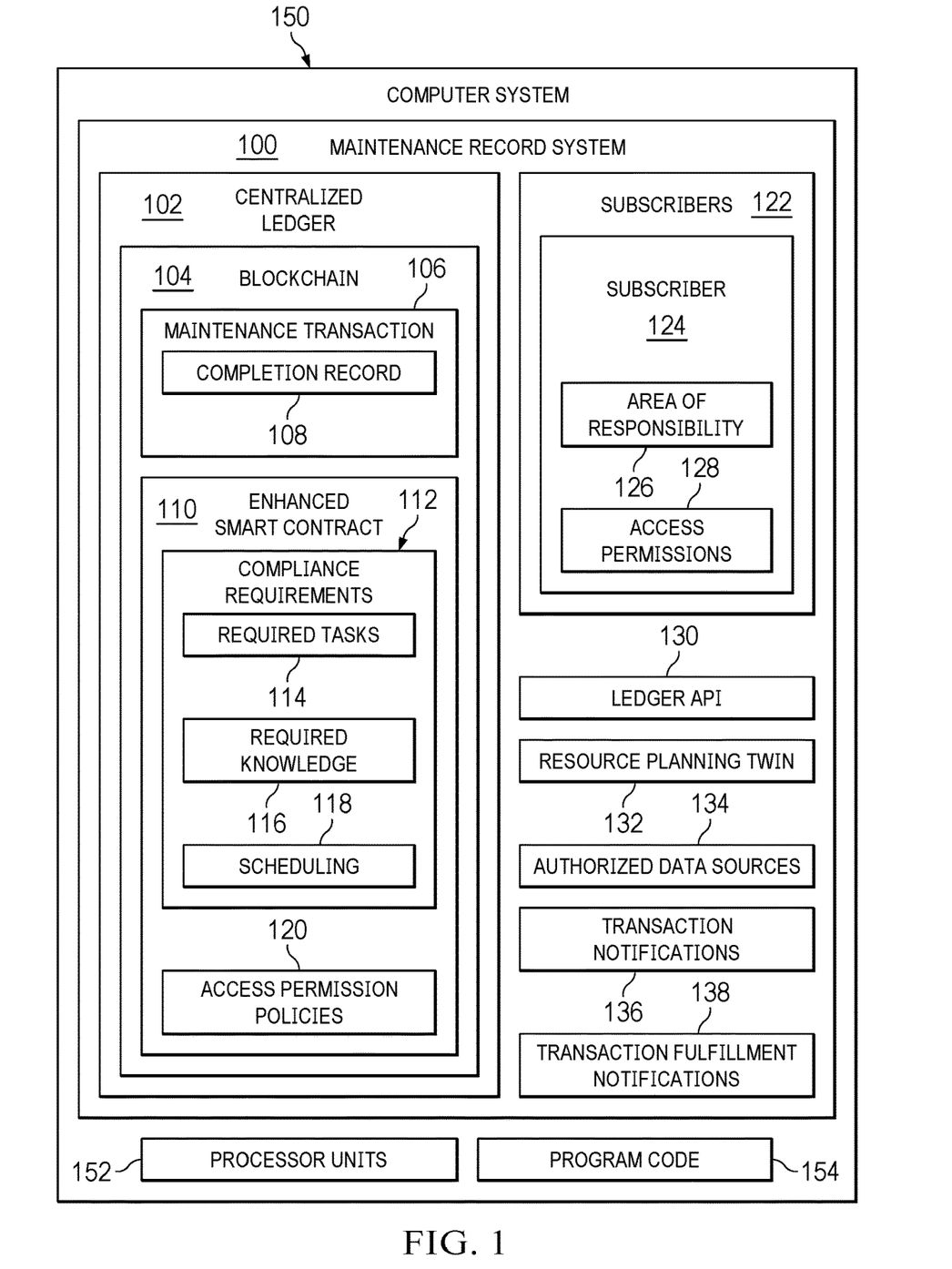
FIG. 1 depicts a block diagram of a maintenance record system in accordance with an illustrative embodiment.

With reference now to FIG. 1, a block diagram of a maintenance record system is depicted in accordance with an illustrative embodiment. Maintenance record system 100 comprises a centralized ledger 102, which might take the form of a distributed ledger. Centralized ledger 102 comprises a blockchain 104. Blockchain 104 is able to record transactions across multiple computers or nodes in a network, each of which maintains a copy of the blockchain. Once a transaction is recorded in blockchain 104 it is immutable. All transactions are visible to any party with access to the network.

Centralized ledger 102 records maintenance transaction 106 in blockchain 104. An enhanced smart contract 110 associated with maintenance transaction 106 is also stored in blockchain 104. Enhanced smart contract 110 is a self-executing contract with a number of compliance requirements (rules) for completing the maintenance transaction 106 written into its code. Enhanced smart contract 110 melds typical smart contract capabilities with standardized business process models such as BPMN (Business Process Modeling Notation). BPMN is a graphical representation of business processes in a business process diagram (BPD) similar to activity diagrams in unified modelling language (UML). Enhanced smart contract 110 automatically executes when predefined conditions are met.

Compliance requirements 112 might include required tasks 114 for fulfilling maintenance transaction 106, required knowledge 116 associated with the required tasks 114, and scheduling 118 of the required tasks 114 for completion. Enhanced smart contract 110 can retrieve the compliance requirements 112 from a number of certified/authorized data sources 134 in the network with the centralized ledger 102. Using the centralized ledger 102 it is possible for various certified/authorized agents among subscribers 122 to complete compliance requirements 112. Furthermore, a subscriber 124 might have view-only access wherein the subscriber receives results of completed requirements or when a ledger entry is made.

Figure 3:
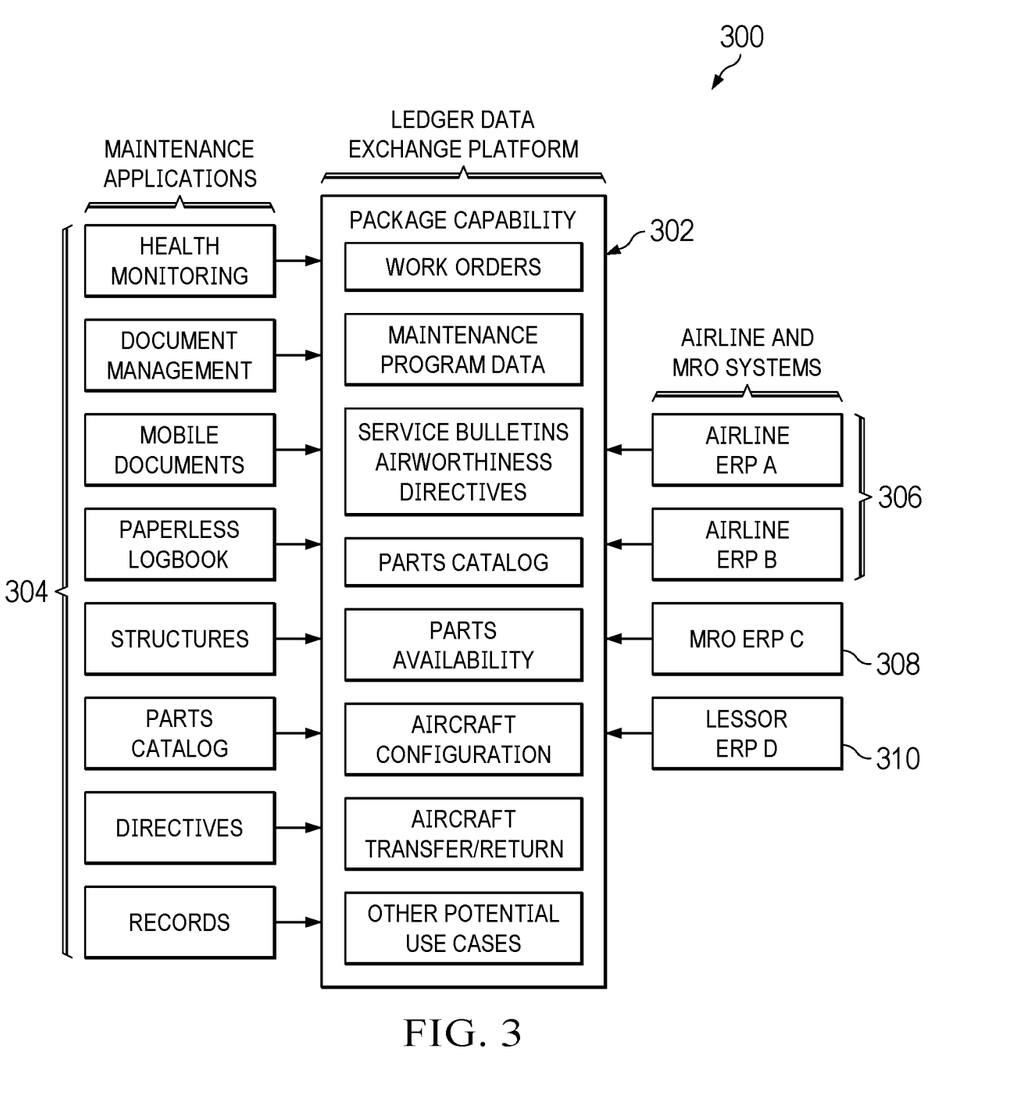
FIG. 3 depicts a diagram of a centralized ledger maintenance system in accordance with an illustrative embodiment.

Centralized ledger 102 might have a number of subscribers 122 (see FIG. 3). Each subscriber 124 has a respective area of responsibility 126 related to fulfillment of the maintenance transaction 106 and access permission 128 that defined the subscribers rights of access to records within the blockchain 104 in accordance with access permission policies 120 of the enhanced smart contract 110.

Figure 4:
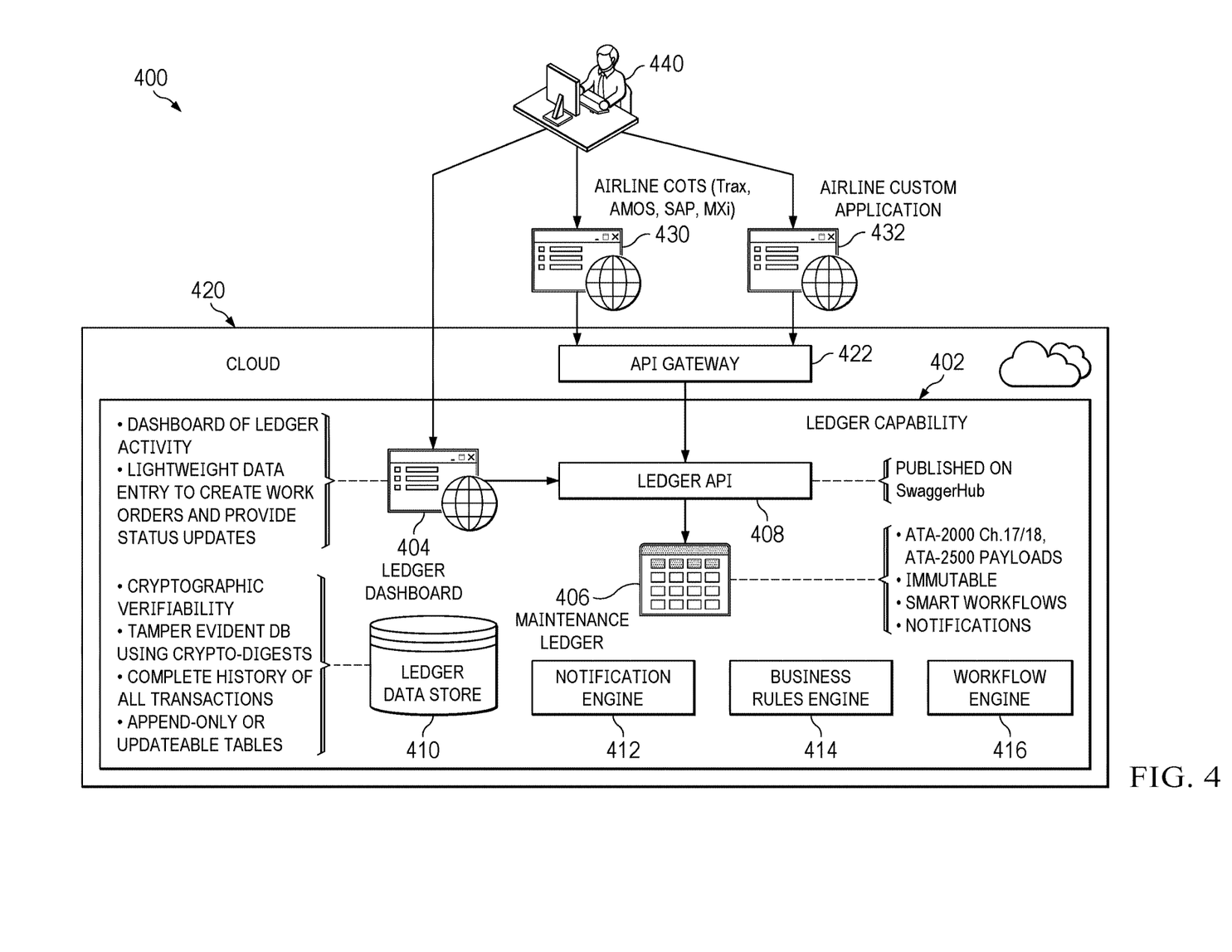
FIG. 4 depicts a diagram of an architecture for a centralized ledger maintenance system in accordance with an illustrative embodiment.

Subscribers 122 have a single point of access to the centralized ledger 102 through a ledger application programming interface (API) 130 (see FIG. 4). By acting as the single point of connection for all subscribers, centralized ledger 102 eliminates the need for multiple point-to-point interfaces between subscribers 122. Centralized ledger 102 might generate a resource planning twin 132 of the subscribers 122 (see FIG. 5).

Figure 6:
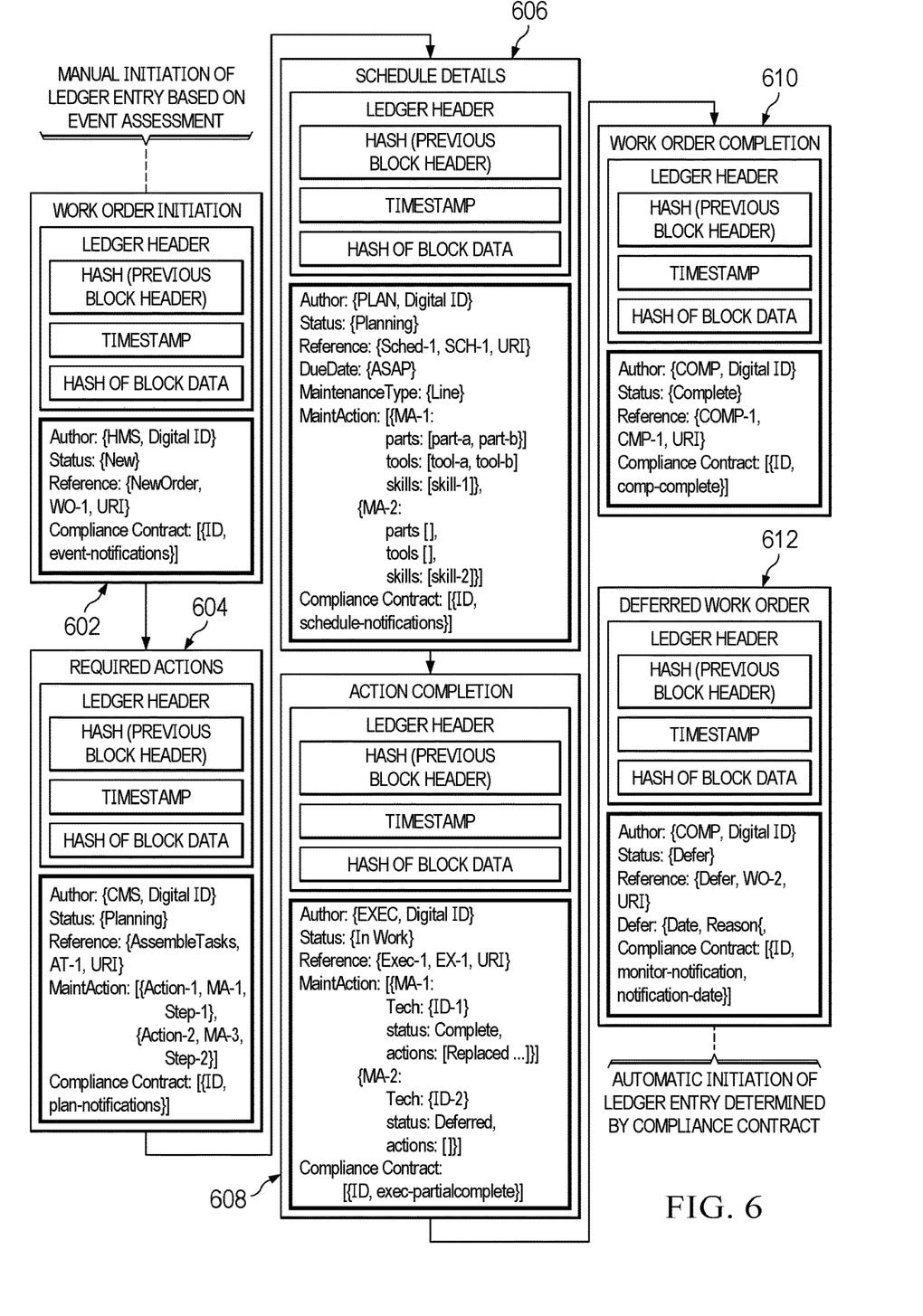
FIG. 6 illustrates examples of types of entries into the centralized ledger in accordance with an illustrative embodiment.
Figure 7A:
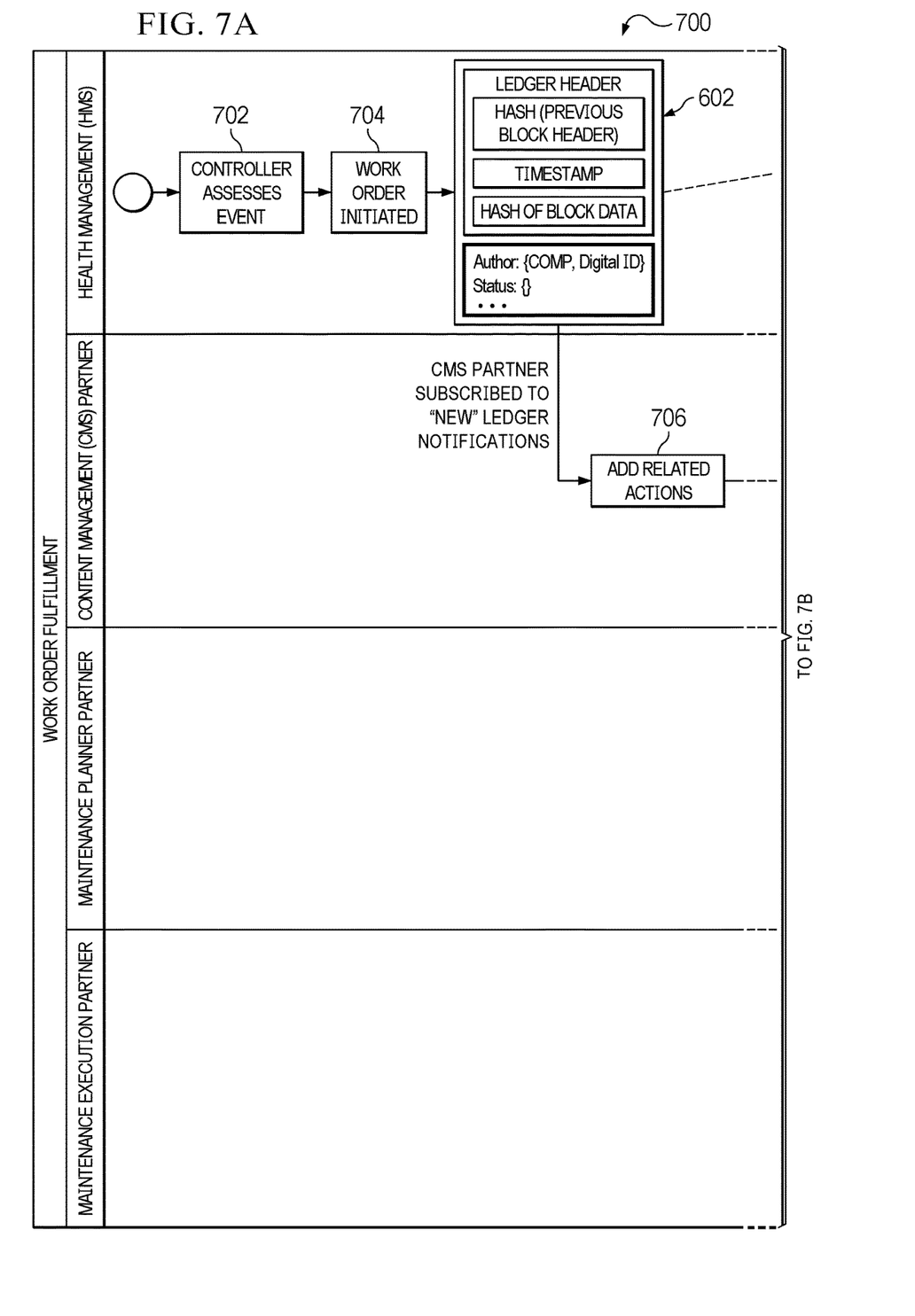
FIGS. 7A-7C illustrate an example process flow for a work order transaction based on the types of entries shown in FIG. 6.
Figure 7B:
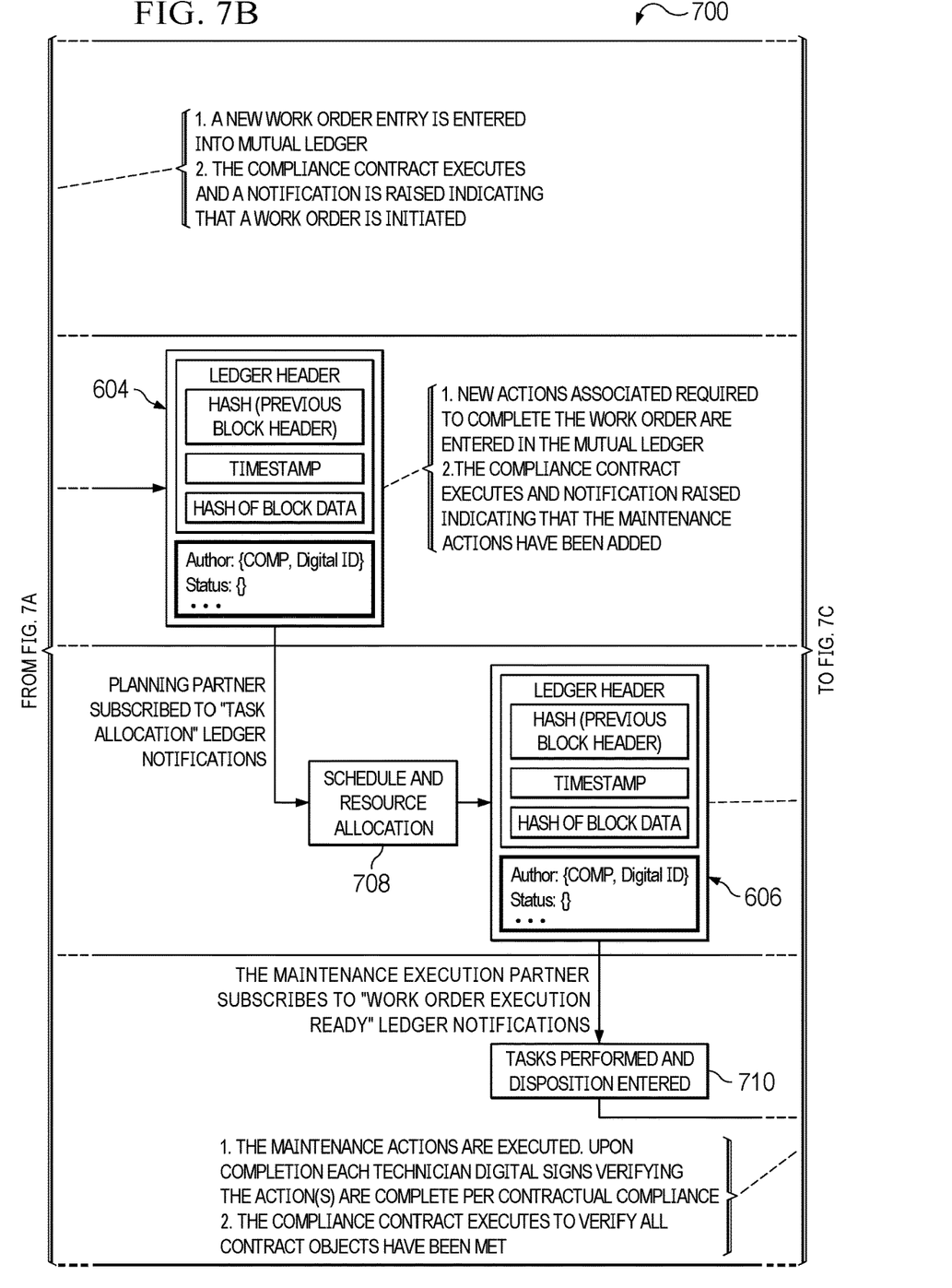
Figure 7C:
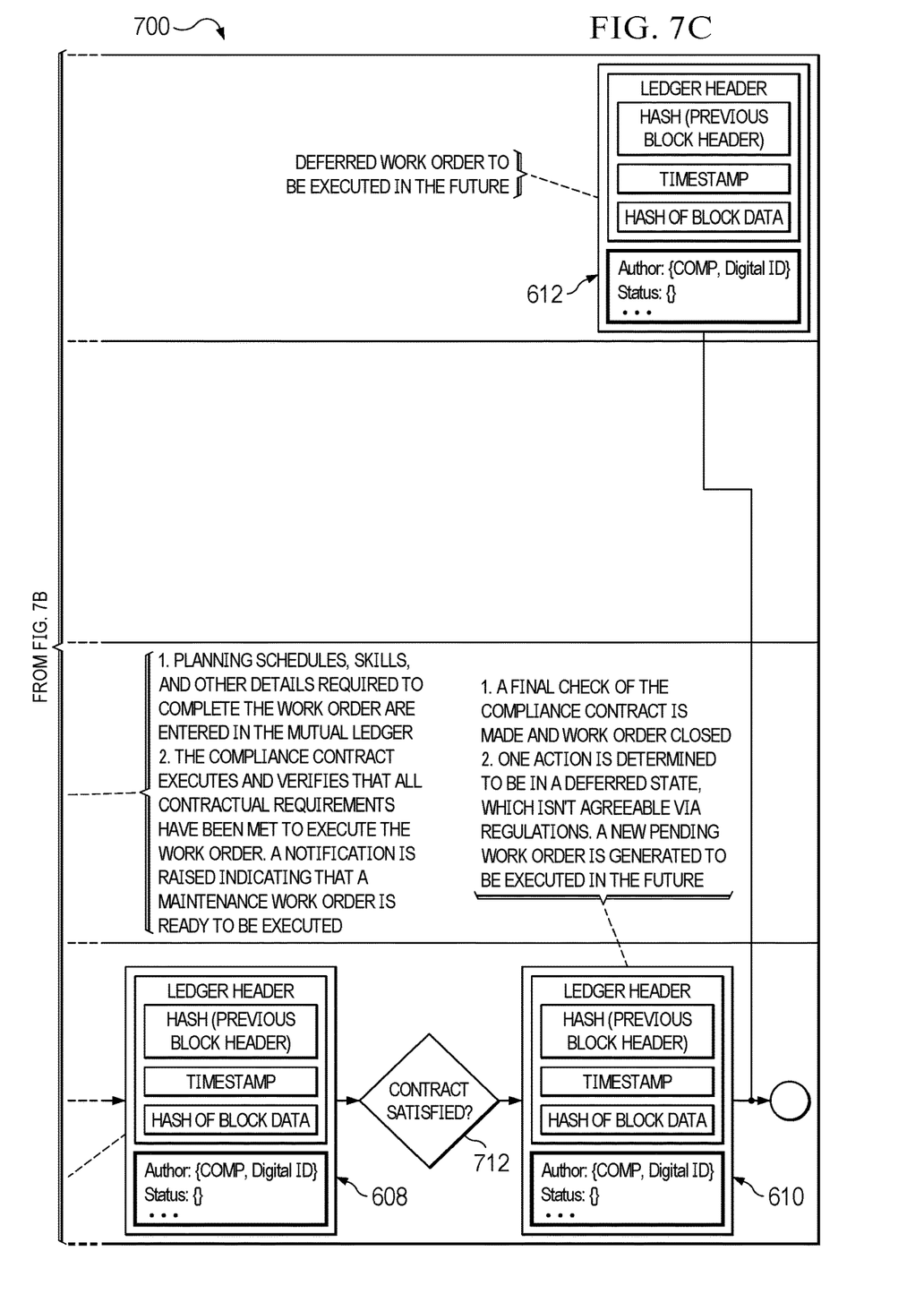

Enhanced smart contract 110 generates transaction notifications 136 to subscribers 122 as different phases of maintenance transaction 106 are completed (see FIGS. 6 and 7). These transaction notifications 136 might be sent to subscribers according to their respective area of responsibility 126 in relation to the maintenance transaction 106 as well as according to their access permissions. Conversely, enhanced smart contract 110 also receives transaction fulfillment notifications 138 in turn from the different subscribers 122 as different phases of the maintenance transaction 106 are completed.

When the maintenance transaction 106 has been completed after satisfaction of all compliance requirements 112, centralized ledger 102 records a completion record 108 in blockchain 104. Completion record 108 cannot be changed once entered in the blockchain. The only way to correct or negate the complete record 108 is to create a new transaction.

Maintenance record system 100 can be implemented in software, hardware, firmware, or a combination thereof. When software is used, the operations performed by maintenance record system 100 can be implemented in program code configured to run on hardware, such as a processor unit. When firmware is used, the operations performed by maintenance record system 100 can be implemented in program code and data and stored in persistent memory to run on a processor unit. When hardware is employed, the hardware can include circuits that operate to perform the operations in maintenance record system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
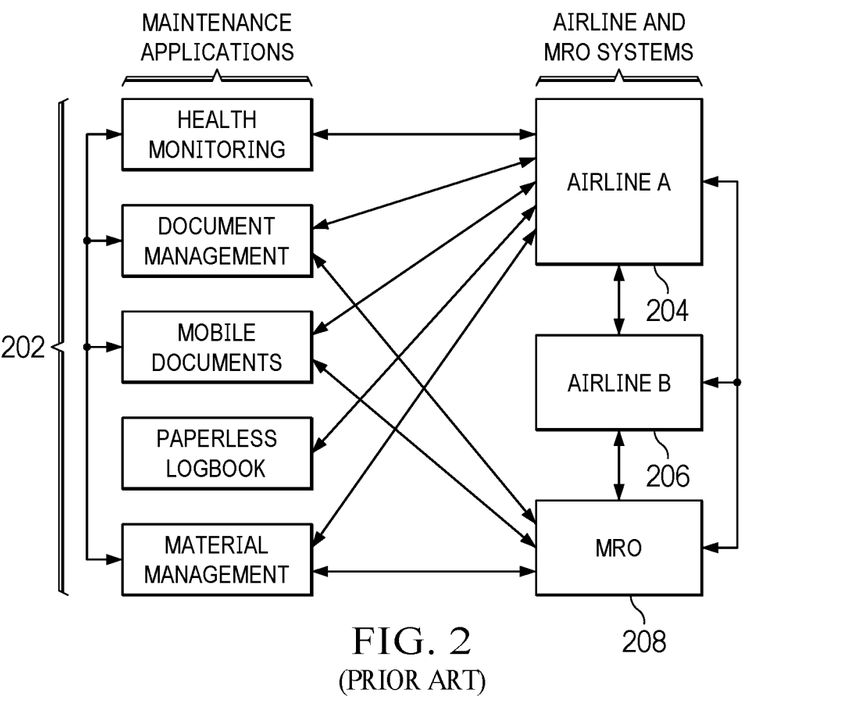
FIG. 2 depicts a diagram of point-to-point interfaces in accordance with the prior art.

FIG. 2 depicts a diagram of point-to-point interfaces in accordance with the prior art. The example in FIG. 2 is related to aircraft maintenance. As shown, each airline 204, 206 and maintenance and repair organizations (MRO) 208 has direct, point-to-point interfaces with each other as well as to a number of maintenance applications 202 related to aircraft maintenance. In addition, the maintenance applications 202 have point-to-point interfaces with each other.

Point-to-point interfaces are expensive to develop and maintain, error prone, and fragile and not easily upgradeable. These shortcomings can result in delays in maintenance planning and execution and present a fractured version of truth where only a subgroup of connected systems receives updates. Another barrier of point-to-point interfaces is the complexity of enhancing functionality (i.e., exchange of additional data). Integration errors can also lead to high costs for airline maintenance operations. Failure of these integration channels can lead to service outages and possible grounding of airplanes, e.g., aircraft on ground (AOG) events, when critical data is not available for servicing an aircraft.

Deriving maintenance information from point-to-point communication among maintenance portfolio products yields no single view of truth for all parties/platforms, which can lead to data consistency errors. This lack of a single view of truth contributes to services outages and grounding of aircraft.

The respective maintenance applications 202 often employ different respective integration patterns. Some of the maintenance applications 202 have multiple touch points with an airline's back office maintenance planning and execution system, all using distinct data models.

In addition, point-to-point interfaces can require lengthy implementation, requiring from 12 months up to several years based on real projects data and often involves semi-manual data loading.

FIG. 3 depicts a diagram of a centralized ledger maintenance system in accordance with an illustrative embodiment. In the present example, centralized ledger maintenance system 300 relates to aircraft maintenance and is an example implementation of maintenance record system 100 in FIG. 1.

The centralized ledger 302 provides a standardized interface via a shared connection point. Centralized ledger 302 acts as a data exchange platform between aircraft manufacturers, airlines, leasing companies, and MRO. In the present example, centralized ledger 302 provides a Packaged Business Capability (PBC) that might handle several services or functions related to aircraft maintenance such as work orders, parts availability, aircraft transfer/return, etc.

In contrast to FIG. 2, wherein each party/platform has direct point-to-point interface with every other, centralized ledger 302 requires only a single interface each for subscribers such as maintenance applications 304, airlines 306, MROs 308, lessors 310, etc. Centralized ledger 302 eliminates the need for custom scripts and interfaces and supports industry standards for aircraft and maintenance data.

FIG. 4 depicts a diagram of an architecture 400 for a centralized ledger maintenance system in accordance with an illustrative embodiment.

A ledger dashboard 404 provides status updates to users 440. The ledger dashboard 404 interacts with the maintenance ledger 406 via a ledger API 408. Ledger API 408 allows users 440 to review all ledger items according to access permissions. Ledger dashboard 404 may have an authorized interface to support enhanced smart contracts.

The maintenance ledger 406 is immutable and comprises smart workflows and notifications. The centralized maintenance ledger 406 includes a ledger database 410 which provides cryptographic verifiability and a complete history of all transactions. Ledger database 410 might be, for example, a structured query language (SQL) database.

The maintenance ledger 406 also includes a notification engine 412 and may also include a business rules engine 414 and workflow engine 416.

The centralized maintenance ledger 406 operates in a ledger capability system 402 that can be deployed in a cloud environment 420. Customized platforms 430, 432 for airlines and MROs can also interact with the centralized maintenance ledger 406 through API gateway 422. Customized platforms 430, 432 may also be part of ledger dashboard 404.

Figure 5:
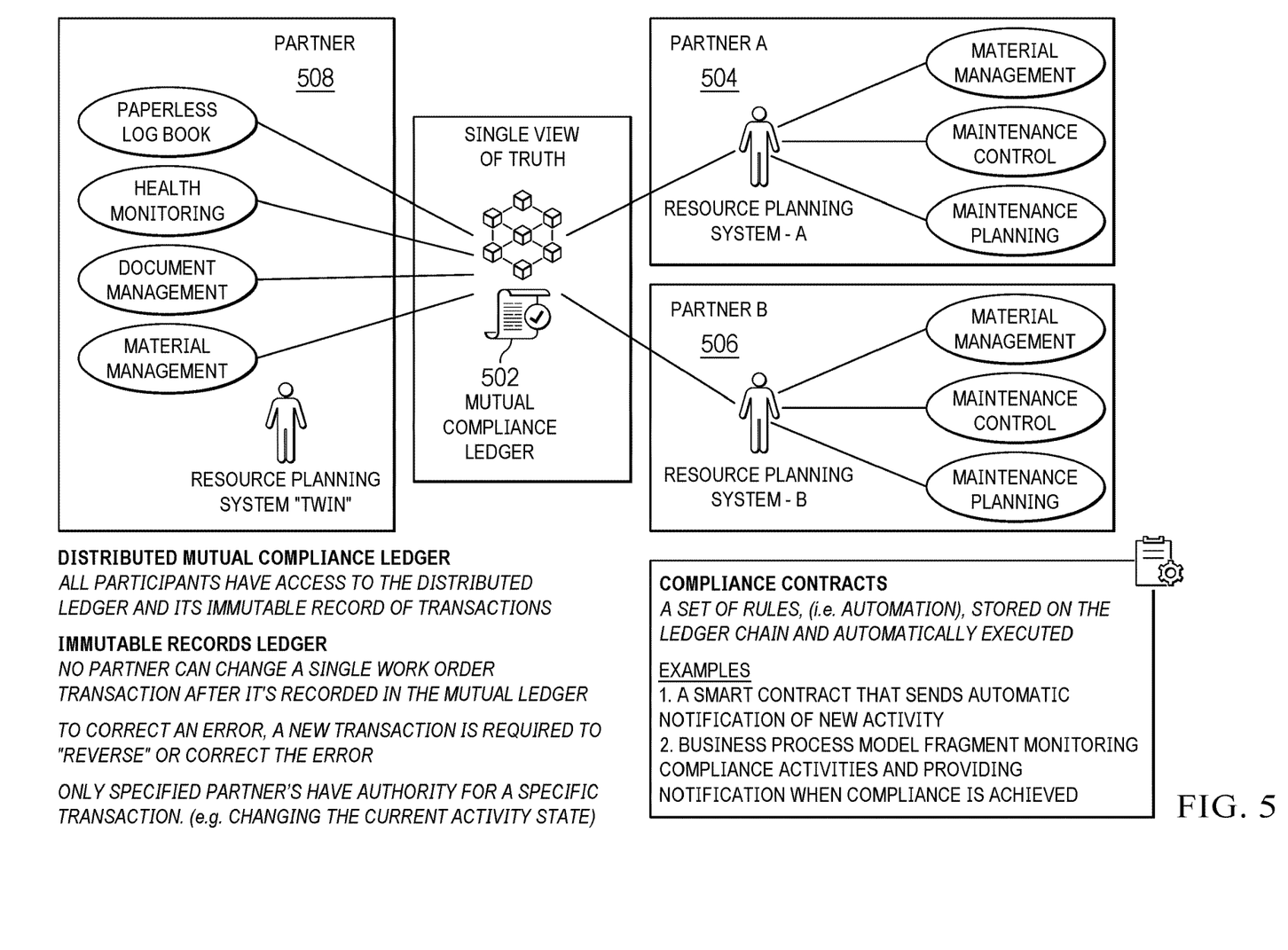
FIG. 5 illustrates the operation of the centralized ledger through the use of enhanced smart contracts in accordance with an illustrative embodiment.

FIG. 5 illustrates the operation of the centralized ledger through the use of enhanced smart contracts in accordance with an illustrative embodiment. The centralized ledger 502 provides a single view of truth for all participating subscribing partners 504, 506. The enhanced smart contract comprises a set of rules that is stored on the ledger blockchain of centralized ledger 502 and is automatically executed. For example, the enhanced smart contract sends automatic notification of new activity. As another example, the enhanced smart contract can monitor compliance activities of business process model fragments and provide notice when compliance is achieved.

The centralized ledger 502 manages maintenance with regulatory requirements. The enhanced smart contract controls the workflow automatically and provides notifications to all subscribing partners 504, 506. Each subscribing partner 504, 506 uses the same centralized ledger 502 for material management, maintenance control, and maintenance planning. The centralized ledger 502 generates a resource planning "twin" 508 of the subscribing partners 504, 506 which provides a paperless log book, health monitoring, document management, and material management.

The distributed centralized ledger 502 allows all subscribing partners 504, 506 to have access to the centralized ledger and its immutable record of transactions. Due to the immutable record of transaction no partner can change a transaction after it is recorded in the blockchain of the centralized ledger 502. To correct an error, a new transaction is required to "reverse" or negate the error in question. Only specified partners have authority for a specific transaction (e.g., changing the current activity state) according to prescribed access permissions.

FIG. 6 illustrates examples of types of entries into the centralized ledger. FIGS. 7A, 7B, and 7C illustrate an example process flow for a work order transaction based on the types of entries shown in FIG. 6.

Process flow 700 begins with a controller assessment event 702 resulting in the manual initiation 704 of a work order 602 based on the assessment. In the present example, the new work order is initiated by a health maintenance service (HMS) which is a partner/subscriber to the centralized ledger. When the new work order is entered into the centralized ledger, an enhanced smart contract (compliance contract) is executed, and a notification is issued indicating that the work order has been initiated.

A content management service (CMS) partner that is subscribed to new ledger notifications receives notice of the new work order and adds 706 required actions 604 related to the work order to the centralized ledger. In response, the enhanced smart contract executes and another notification that the maintenance actions have been added to the centralized ledger is issued.

A maintenance planner partner subscribed to task allocation notifications receives the notification of the require actions 604 added to the centralized ledger. The maintenance planning partner inputs 708 scheduling details 606 into the centralized ledger. These details may comprise planning schedules, skills, and other details required to complete the work order in question. The compliance contract executes and verifies that all contractual and regulatory requirements have been met to execute the work order. Another notification is raised indicating that a maintenance work order is now ready to be executed.

A maintenance execution partner subscribed to notifications for work orders ready for execution receives the notification from the centralized ledger that the work order is ready for execution according to the scheduling details 606. The maintenance execution partner enters the tasks performed and disposition into the centralized ledger as maintenance tasks are completed. Upon completion, a technician digitally signs to verify action completion 608 of the tasks per contractual compliance.

The compliance contract executes to verify that all contract objects have been met 712. Upon verification of completion of work tasks 610 according to contractual requirements a final check of the compliance contract is made, and the work order is closed.

If any of the required actions is determined not to be in compliance with regulations, the action is placed in a deferred stated, and a deferred work order 612 is generated to be executed in the future.

The centralized ledger therefore provides a single view of truth with transparency across business partners. The immutable ledger captures partner compliance action. The centralized ledger automatically validates compliance and execution of processes. The centralized ledger also eliminated the need for maintaining point-to-point partner integrations. Compliance contracts can be supported as enhanced smart contracts assigned as ledger entries.

Figure 8:
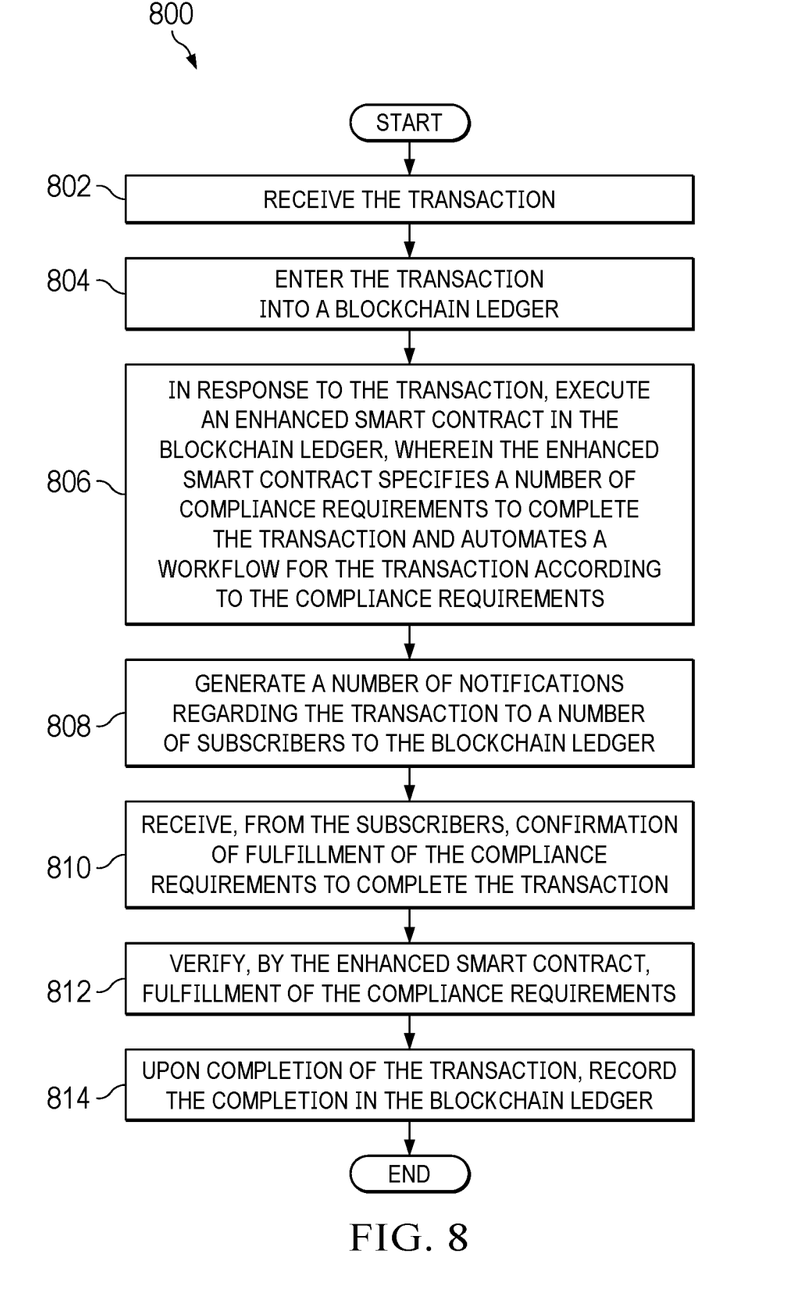
FIG. 8 depicts a flowchart of a process for processing a vehicle maintenance transaction in accordance with an illustrative embodiment.

FIG. 8 depicts a flowchart of a process for processing a vehicle maintenance transaction in accordance with an illustrative embodiment. Process 800 can be implemented in hardware, software, or both. When implemented in software, the process can take the form of program code that is run by one of more processor units located in one or more hardware devices in one or more computer systems. For example, process 800 can be implemented in maintenance record system 100 in FIG. 1.

Process 800 begins by receiving the transaction (operation 802) and entering the transaction into a blockchain ledger (operation 804).

In response to the transaction, an enhanced smart contract in the blockchain ledger executes (operation 806). The enhanced smart contract specifies a number of compliance requirements to complete the transaction and automates a workflow for the transaction according to the compliance requirements. The compliance requirements might comprise a number of tasks required for the transaction, technical knowledge required by the tasks, and scheduling of the tasks. The enhanced smart contract might retrieve the compliance requirements for the transaction from a number of data sources.

Process 800 generates a number of notifications regarding the transaction to a number of subscribers to the blockchain ledger (operation 808). The subscribers might include manufacturer applications, airlines, and maintenance and repair organizations. The enhanced smart contract may limit access of the subscribers to records in the blockchain ledger according to access permissions. The enhanced smart contract may control which subscribers receive notifications according to the access permissions.

The blockchain ledger receives from the subscribers confirmation of fulfillment of the compliance requirements to complete the transaction (operation 810).

The enhanced smart contract verifies fulfillment of the compliance requirements (operation 812). Upon completion of the transaction, the completion is recorded in the blockchain ledger. Process 800 then ends. The record in the blockchain ledger of completion of the transaction can only be negated by creating a new transaction.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
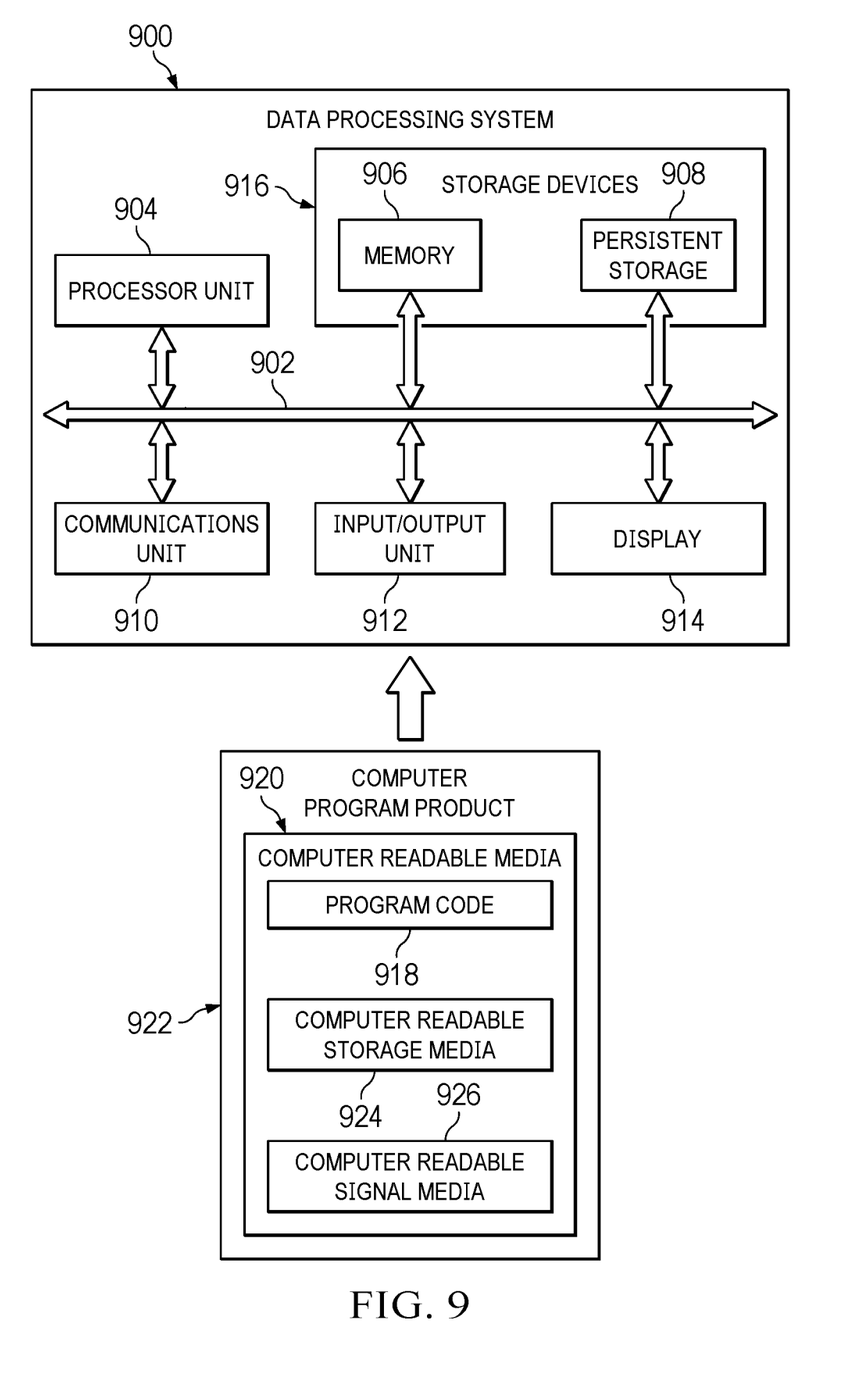
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer system 150 in FIG. 1. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (GPUS).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for transmitting notifications of maintenance work on a vehicle, the method comprising using a number of processors to perform:
    receiving transactions from multiple sources with different data integration patterns and models through a single application programming interface, the multiple sources comprising applications comprising at least: health monitoring, document management, mobile documents, a paperless logbook, structures, a parts catalog, directives, and records, for the vehicle;
    the single application programming interface transforming each of the different data integration patterns and models for entering the transactions into a blockchain ledger serving as a single point of truth for all transactions regarding the vehicle;
    in response to the transactions, executing an enhanced smart contract in the blockchain ledger, wherein the enhanced smart contract specifies a number of compliance requirements to complete the transactions and creates a workflow for the transactions that will fulfill all the compliance requirements;
    generating, in a notification engine, and transmitting a number of notifications regarding the transactions to a number of subscribers to the blockchain ledger comprising at least: airlines, maintenance and repair organizations, and aircraft lessors, and thereby eliminating a need for custom scripts and point-to-point interfacing between the number of subscribers;
    receiving, from the subscribers, confirmation of fulfillment of the compliance requirements to complete the transactions;
    verifying, by the enhanced smart contract, fulfillment of the compliance requirements; and
    upon completion of the transactions and fulfillment of the compliance requirements, recording the completion in the blockchain ledger.

2. The method of claim 1, wherein the compliance requirements comprise:
    a number of tasks required for the transactions;
    technical knowledge required by the tasks; and
    scheduling of the tasks.

3. The method of claim 1, wherein the enhanced smart contract retrieves the compliance requirements for the transactions from the multiple sources.

4. The method of claim 1, wherein a record in the blockchain ledger can only be negated by creating a new transaction.

5. The method of claim 1, wherein the enhanced smart contract limits access of the subscribers to records in the blockchain ledger according to access permissions.

6. The method of claim 5, wherein the enhanced smart contract controls which subscribers receive notifications according to the access permissions.

7. The method of claim 1, wherein the subscribers to the blockchain ledger include at least one of:
    maintenance applications;
    airlines; or
    maintenance and repair organizations.

8. The method of claim 1, wherein the blockchain ledger generates a resource planning twin of the subscribers.

9. A system configured to transmit notifications for maintenance work on a vehicle, the system comprising:
    a storage device that stores program instructions;
    one or more processors operably connected to the storage device and configured to execute the program instructions to cause the system to:
        receive transactions from multiple sources with different data integration patterns and models through a single application programming interface, the multiple sources comprising applications comprising at least: health monitoring, document management, mobile documents, a paperless logbook, structures, a parts catalog, directives, and records, for the vehicle;
        transform each of the different data integration patterns and models and enter the transactions into a blockchain ledger that creates a single point of truth for all transactions about the vehicle;
        in response to the transactions, execute an enhanced smart contract in the blockchain ledger, wherein the enhanced smart contract specifies a number of compliance requirements to complete the transactions and creates a workflow for the transactions that fulfills all the compliance requirements;
        generate and transmit through a notification engine a number of notifications regarding the transactions to a number of subscribers to the blockchain ledger that comprise at least: airlines, maintenance and repair organizations, and aircraft lessors, wherein the number of notifications eliminate a need for custom scripts and point-to-point interfaces among the number of subscribers;
        receive, from the subscribers, confirmation of fulfillment of the compliance requirements to complete the transactions;
        verify, by the enhanced smart contract, fulfillment of the compliance requirements; and
        upon completion of the transactions and fulfillment of the compliance requirements, record the completion in the blockchain ledger.

10. The system of claim 9, wherein the compliance requirements comprise:
- a number of tasks required for the transactions;
- technical knowledge required by the tasks; and
- scheduling of the tasks.

11. The system of claim 9, wherein the enhanced smart contract retrieves the compliance requirements for the transactions from the multiple sources.

12. The system of claim 9, wherein a record in the blockchain ledger can only be negated by creating a new transaction.

13. The system of claim 9, wherein the enhanced smart contract limits access of the subscribers to records in the blockchain ledger according to access permissions.

14. The system of claim 13, wherein the enhanced smart contract controls which subscribers receive notifications according to the access permissions.

15. The system of claim 9, wherein the subscribers to the blockchain ledger include at least one of:
- maintenance applications;
- airlines; or
- maintenance and repair organizations.

16. The system of claim 9, wherein the blockchain ledger generates a resource planning twin of the subscribers.

17. A computer program product configured to transmit notifications of maintenance requirements of a vehicle, wherein the computer program product comprises:
- a computer-readable storage medium having program instructions embodied thereon to perform the steps of:
    - receiving transactions from multiple sources with different data integration patterns and models through a single application programming interface, the multiple sources comprising applications comprising at least: health monitoring, document management, mobile documents, a paperless logbook, structures, a parts catalog, directives, and records, for the vehicle;
    - the single application programming interface transforming each of the different data integration patterns and models for entering the transactions into a blockchain ledger serving as a single point of truth for all transactions regarding the vehicle;
    - in response to the transactions, executing an enhanced smart contract in the blockchain ledger, wherein the enhanced smart contract specifies a number of compliance requirements to complete the transactions and creates a workflow for the transactions that will fulfill all the compliance requirements;
    - generating, in a notification engine, and transmitting a number of notifications regarding the transactions to a number of subscribers to the blockchain ledger comprising at least: airlines, maintenance and repair organizations, and aircraft lessors, and thereby eliminating a need for custom scripts and point-to-point interfacing between the number of subscribers;
    - receiving, from the subscribers, confirmation of fulfillment of the compliance requirements to complete the transactions;
    - verifying, by the enhanced smart contract, fulfillment of the compliance requirements; and
    - upon completion of the transactions and fulfillment of the compliance requirements, recording the completion in the blockchain ledger.

18. The computer program product of claim 17, wherein the compliance requirements comprise:
- a number of tasks required for the transactions;
- technical knowledge required by the tasks; and
- scheduling of the tasks.

19. The computer program product of claim 17, wherein the enhanced smart contract retrieves the compliance requirements for the transactions from a number of authorized data sources.

20. The computer program product of claim 17, wherein a record in the blockchain ledger can only be negated by creating a new transaction.

\* \* \* \* \*